US006661437B1

(12) United States Patent  (10) Patent No.: US 6,661,437 B1
Miller et al.  (45) Date of Patent: Dec. 9, 2003

(54) HIERARCHICAL MENU GRAPHICAL USER INTERFACE

(75) Inventors: Robert Howard Miller, Leawood, KS (US); Sheila Renee Crosby, Crystal Lake, IL (US); Robert Joseph Logan, Indianapolis, IN (US)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/402,523

(22) PCT Filed: Dec. 15, 1997

(86) PCT No.: PCT/US97/22832
§ 371 (c)(1),
(2), (4) Date: Oct. 5, 1999

(87) PCT Pub. No.: WO98/47063
PCT Pub. Date: Oct. 22, 1998

Related U.S. Application Data

(60) Provisional application No. 60/043,539, filed on Apr. 14, 1997.

(51) Int. Cl.[7] ................................................ G09G 5/00
(52) U.S. Cl. ........................ 345/810; 345/720; 345/721; 345/764; 345/829; 345/841
(58) Field of Search ................................ 345/810, 841, 345/764, 811, 853, 765, 828, 829, 830, 720, 721, 722, 741, 743, 733, 820

(56) References Cited

U.S. PATENT DOCUMENTS

| 4,843,538 A | * | 6/1989 | Lane et al. ............... 700/83 |
| 5,410,326 A | * | 4/1995 | Goldstein ................ 348/134 |
| 5,559,945 A | * | 9/1996 | Beaudet et al. .......... 345/156 |
| 5,581,685 A | * | 12/1996 | Sakurai .................. 345/841 |
| 5,615,347 A | | 3/1997 | Davis et al. ............. 395/349 |
| 5,734,853 A | * | 3/1998 | Hendricks et al. ....... 395/352 |
| 5,781,247 A | * | 7/1998 | Wehmeyer et al. ....... 348/569 |
| 5,784,059 A | * | 7/1998 | Morimoto et al. ....... 345/841 |
| 5,880,720 A | * | 3/1999 | Iwafune et al. ......... 345/716 |
| 5,901,246 A | * | 5/1999 | Hoffberg et al. ........ 382/209 |
| 6,023,267 A | | 2/2000 | Chapuis et al. ......... 345/327 |

FOREIGN PATENT DOCUMENTS

| EP | 0617556 A1 | 9/1984 | .......... H04N/5/445 |
| GB | 2271447 | 4/1994 | |

OTHER PUBLICATIONS

IBM Technical Disclosure Bulletin, vol. 33, No. 11, Apr. 1991 "Integrated Audio–Graphics User Interface" pp. 368–371.
Search Report.
"Integrated Audio–Graphics User Interface" IBM Technical Disclosure Bulletin, vol. 33, No. 11, Apr. 1, 1991, pp. 368–371.

(List continued on next page.)

Primary Examiner—John Cabeca
Assistant Examiner—Cuong T. Thai
(74) Attorney, Agent, or Firm—Joseph S. Tripoli; Ronald H. Kurdyla; Joel M. Fogelson

(57) ABSTRACT

A disclosed processing device, including an on-screen User interface display, incorporates a means for generating a display of a plurality of hierarchically ordered menus. The menus include a current menu) and a preceding parent menu showing a selection path from the parent menu to the current menu. Also a menu selection item within the hierarchical menu display provides a User at least one of, a) a display of control information for the device, and b) control parameter data entry capability. The processing device also incorporates a means for updating the on-screen display in response to User menu item selection. The processing device may also include a means for altering the device operation in response to an updated operating parameter value. Also, the selection path may indicate menu entry and exit points separated by at least one intervening menu item.

29 Claims, 11 Drawing Sheets

OTHER PUBLICATIONS

"Two–Pane Window for Dynamic Selection Path", Research Disclosure, vol. 343, Nov. 1, 1992, p. 817.

"Menu Method" IBM Technical Disclosure Bulletin, vol. 32, No. 4A Sep. 1989, p. 285/286.

"Design for an Application Window Toolbox Menu" IBM Technical Disclosure Bulletin, vol. 36, No. 5/ May 1, 1993, p. 263/264.

"Three–Dimensional Menu Icons to Aid Users in Understanding Hierarchy" IBM Technical Disclosure Bulletin, vol. 33, No. 12, May 1, 1991, p. 464/465.

"Sorting X. 400 Mail Items" IBM Technical Disclosure Bulletin, vol. 34, No. 4B, Sep. 1, 1991, pp. 340–341.

* cited by examiner

HIERARCHICAL MENU GRAPHICAL USER INTERFACE

This application is a 371 of PCT/US97/22832 filed Dec. 15, 1997 and claims benefit of U.S. Prov. No. 60/043,539 filed Apr. 14, 1997.

FIELD OF THE INVENTION

This invention is relates to menu driven graphical User display interfaces.

BACKGROUND OF THE INVENTION

Consumer electronic devices such as Digital Versatile Disk (DVD) players, combination Personal Computer and television devices (PC/TV systems), satellite receivers and Internet compatible devices (e.g. NETPCs) increasingly involve complex User interactive tasks. These tasks include initial device set-up, selection of operational functions, programming User preferences, determining conditional access and User entitlement to programs. Other tasks include operating Application programs, selecting audio/visual characteristics, selecting communication functions and obtaining help or User instructions from a manual, for example. A problem is presented by the need to devise a User interface for such devices that supports these complex User interactive tasks whilst providing a simple command interface suitable for the general public.

This problem and derivative problems are addressed by a system according to the present invention.

SUMMARY OF THE INVENTION

A system including an on-screen User interface display generates a display of multiple hierarchically ordered menus. The menus include a current menu and a preceding parent menu showing a selection path from the parent menu to the current menu. A menu selection item within the hierarchical menu display provides a User at least one of a) a display of control information for the device, and b) control parameter data entry capability. The on-screen display is updated in response to User menu item selection.

DETAILED DESCRIPTION OF THE DRAWINGS

The inventors have recognized that a hierarchically ordered menu structure advantageously provides a simple graphical user interface for User interactive operation of apparatus including consumer electronic devices such as a DVD player, for example. A hierarchically ordered menu structure also advantageously provides a simple interface for User operation of Application programs running on Personal Computers (PCs) or other devices.

The inventors have further recognized that significant advantage may be accrued by continuously displaying a hierarchical menu structure for the duration of a User's operation of a device or Application program. A User's ability to navigate through multiple menus and operational tasks is improved by maintaining the menu structure visible and on-screen for the duration of device or program operation. Such a menu system allows a User to know where he is within a complex multi-level menu structure and to be able to readily advance and re-trace through the structure. The hierarchical menu structure is automatically scrolled in order to maintain a currently active menu on-screen. In addition, both menu entry and exit points and previously selected menu items are identified (e.g. by highlighting) to enable a User to readily see the menu navigation path and operation sequence he has followed. Menu entry and exit points separated by one or more intervening menu items are also identified.

Individual menus within the hierarchy comprise one or more selectable items that may display device control parameters or enable User entry of device control parameters. As such the User interface accommodates display and entry of control parameters supporting functions including device set-up, device operation and adjustment, User preference selection, conditional access and User entitlement management, audio/visual characteristic selection, communication function initiation, and User help or instruction, for example. The interface may also be used to guide a User through a predetermined sequence of functions e.g. adjustment of display brightness, contrast etc. The interface may also be used in a program guide application to enable a User to navigate through program selection, for example. A user may select a program theme (e.g. movies from options also including news, documentaries, sports etc.) in a first menu then navigate to a succeeding menu for selection of a topic (e.g. comedy from options also including thriller, science fiction, romance etc.).

Figure 1:
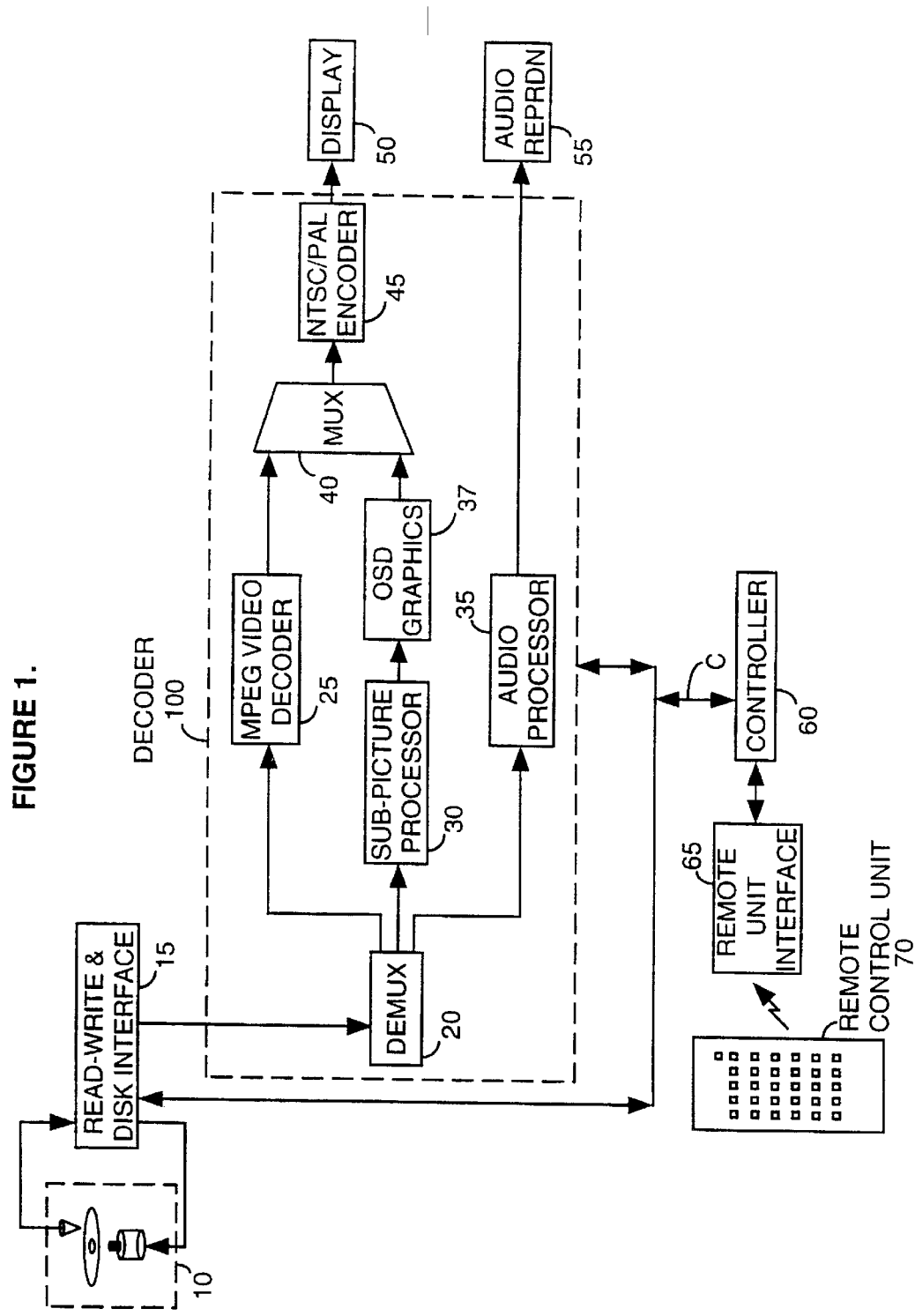
FIG. 1 shows a Digital Versatile Disc (DVD) system providing an on-screen User interface display in the form of a set of User interactive hierarchical control and information displays, according to the invention.

FIG. 1 shows a Digital Versatile Disc (DVD) system, according to the invention, providing an on-screen User interface display in the form of a set of User interactive, hierarchical, control and information displays. This DVD system is capable of playing both DVD disks and audio CD disks. Decoder 100 reads and writes data via interface 15 to a disk storage medium 10 in response to User commands. The commands are entered by a User with remote control unit 70 via remote interface 65 and are processed by controller 60. Decoder 100 also decodes MPEG compatible audio and video data for reproduction on audio unit 55 and video display 50. The MPEG (Moving Pictures Expert Group) compatible data is encoded according to an image encoding standard, hereinafter referred to as the "MPEG standard". The MPEG standard is comprised of a system encoding section (ISO/IEC 13818-1, Jun. 10, 1994) and a video encoding section (ISO/IEC 13818-2, Jan. 20, 1995), hereinafter referred to as the "MPEG systems standard" and "MPEG video standard" respectively.

The interactive, hierarchical, control and information displays presented on unit 50 enable function selection and entry of device control parameters (including operating parameters) for User operation of DVD decoder 100. Individual menus within the hierarchy accommodate control parameter entry and display for supporting decoder 100 functions including device set-up, device operation and adjustment, User preference selection, conditional access and User entitlement management, audio/visual characteristic selection, communication function initiation, and User help and instruction, for example. Other menus are used to guide a User through a predetermined sequence of functions e.g. adjustment of display brightness, contrast etc.

Although the disclosed User interface system is described in the context of a system for operating a consumer electronics device, this is exemplary only. The principles of the invention may be applied in User interface systems for operating other, non-consumer electronics apparatus and for operating Application programs on Personal Computers (PCs) or other devices, for example. In addition the invention principles may be used in a User interface for non-MPEG compatible systems that process data such as telephone messages, computer programs, Internet data or other communications, for example.

Considering read mode operation of the (DVD) system of FIG. 1, program representative data from storage medium 10 is demodulated, deinterleaved, Reed-Solomon error corrected and descrambled by interface unit 15. The resultant decoded datastream is provided to demultiplexer 20. A User operates DVD decoder 100 by selecting options shown on a set of hierarchical menus displayed on unit 50. The options are selected using commands entered with remote control unit 70 via remote interface 65. In this manner the User selects a program for viewing and initiates functions relating to the set-up, operation and adjustment of the DVD system. The entered commands are processed by controller 60 which controls the operation of the elements of decoder 100 using a bi-directional data and control signal bus C. Controller 60 controls the functions of individual elements within decoder 100 by setting control register values within these elements using control bus C.

The packetized decoded datastream output by interface 15 contains video and audio data representing a selected movie, for example, and also contains sub-picture data. The sub-picture data derived from storage medium 10 contains picture elements associated with the programs stored on the storage medium such as display commands, subtitling, content menus, descriptive text, selectable menu options or other items, for example. Packets containing video, audio and sub-picture data are identified in the decoded datastream from interface 15 by demultiplexer 20 using Packet Identifier (PID) values contained in their respective packet headers.

Demultiplexer 20 matches the PIDs of incoming packets in the datastream from interface 15 with PID values pre-loaded in control registers within unit 20 by controller 60. Demultiplexer 20 provides the video, audio and sub-picture packets to MPEG video decoder 25, audio processor 35 and sub-picture processor 30 respectively. Decoder 25 decodes and decompresses the MPEG compatible packetized video data from unit 20 and provides decompressed program representative pixel data to NTSC encoder 45 via multiplexer 40. Similarly, audio processor 35 decodes the packetized audio data from unit 20 and provides decoded and amplified audio data synchronized with the associated decompressed video data to device 55 for audio reproduction.

Processor 30 decodes and decompresses sub-picture data received from unit 20 to provide decompressed pixel mapped data to On-Screen Display (OSD) and graphics generator 37. Unit 37 creates a set of interactive, hierarchical, control and information menu displays for presentation on unit 50. These menu displays include, for example, the displays shown in FIGS. 2–11, that enable function selection and entry of device operating parameters for User operation of DVD decoder 100. The hierarchical menu displays are generated in the form of overlay pixel map data by OSD generator 37 under direction of controller 60. Controller 60 employs a database supporting the update of the unit 50 menu display. The database links particular menus in the hierarchical structure with selectable menu option icons in the menu currently displayed on unit 50. Controller 60 is thereby enabled to determine and generate the next hierarchical menu to be displayed on unit 50 in response to User selection of a current menu option icon.

Controller 60 executes preprogrammed instructions constituting an operating system customized for DVD decoder 100 operation. In executing the instructions, controller 60 together with unit 37, generates a hierarchical sequence of automatically scrolling menus for continuous display on unit 50 for the duration of a User's interactive operation of DVD device 100. Controller 60 with unit 37 automatically scrolls the displayed portion of the continuous hierarchical menu structure, both horizontally and vertically, in order to maintain the currently active portion of the menu structure on the unit 50 screen. As a User navigates through the menus, the currently active and most recently selected menu is scrolled horizontally towards the left of the unit 50 display window with previous menus being displayed on the right of the current menu.

Controller 60 removes the menu structure displayed on unit 50 upon activation of certain functions such as, for example, upon a User initiating play of a movie. However, upon completion of the selected function e.g. at the end of a movie, controller 60 together with unit 37, again generates a menu for display on unit 50 and returns the displayed User interface to the encompassing hierarchical menu structure. Further, the controller 60 operating system continuously functions within the context of the hierarchical menu structure and retains a record of the last selected menu options, even when the menu structure is not displayed, e.g. during movie play. Thereby, controller 60 is able to re-establish the last selected menu and retain location within the menu structure upon completion of a function external to the menu structure such as at the end of movie play, for example.

Alternatively, controller 60 in another embodiment may return decoder 100 operation to a different menu within the structure upon completion of a task.

A User's ability to navigate through multiple menus and operational tasks is improved by the maintenance of the menu structure visible and on-screen by DVD decoder 100 for the duration of a User's interactive operation of the DVD system. The menu structure is continuously visible except for intervals requiring use of the full display screen such as during movie play, for example. Similarly, in operating Application programs (e.g. a word processing program), similar advantage is achievable by maintaining such a menu structure continuously visible except for intervals requiring full display screen use e.g. during operation of the Application program. This feature allows a User to know where he is within a complex multi-level menu structure and to be able to readily advance and re-trace through the structure. Decoder 100 automatically scrolls the hierarchical menu structure to maintain a currently active menu on-screen.

In addition, both menu entry and exit points and previously selected menu items are identified (e.g. by dashed lines or dashed features or by highlighting, coloring, shading including three dimensional shading, or hatching) to enable a User to readily see the menu navigation path and operation sequence he has followed. A User may navigate through the menu structure in sequential fashion from one menu to an adjacent menu i.e. a previous or next menu as is illustrated later in connection with FIGS. 2–11. Random navigation jumps from the current menu to another non-adjacent menu are not normally permitted. However, such a jump is permitted under certain conditions, such as upon a power interruption or an error condition or for rapid orientation or recovery purposes, for example. Under these conditions, a User is allowed to initiate a return to a master or base menu upon activation of particular commands via remote unit 70.

Controller 60 scrolls the menu structure by determining the portion of the menu structure to be displayed in response to both menu item selection and navigation commands e.g. directional arrow or cursor commands for advancing or retracing through the menu structure. Controller 60 selects the portion of the menu structure for display from a predetermined and prestored set of hierarchical (tree-structured) display menus. Provision is also made for a User to add both new menus and menu items to the structure through customization functions by use of a data entry device such as remote unit 70 or a keyboard, for example (not shown). OSD generator 37 under direction of controller 60 updates the corresponding OSD pixel map overlay data with pixel data representing the selected menu structure.

Unit 37 linearly combines the sub-picture pixel map data from processor 30 with the OSD unit 37 overlay pixel map data representing the menu structure selected for display. The combined pixel map data is provided to multiplexer 40. Controller 60 directs either the combined pixel map menu data from unit 37, or the decompressed program representative pixel data from decoder 25, to a pixel map memory buffer in NTSC encoder 45.

In another mode both the combined pixel map data from unit 37 and the decompressed program data are directed to encoder 45 via multiplexer 40. In this mode the data is combined in the unit 45 pixel map memory buffer under direction of controller 60 to form a composite display. The composite display contains both video e.g. a movie and an overlay of the combined pixel map data to allow, for example, for adjustment of display parameters whilst playing a movie.

In normal operation of the DVD system, the combined pixel map menu data from unit 37 is displayed on unit 50 without video data (e.g. movie data) from unit 25. For this purpose, multiplexer 40, under control of unit 60, directs the combined pixel map menu data from unit 37 to the pixel map memory buffer in NTSC encoder 45 for storage.

Encoder 45 converts the combined pixel map menu data stored in its memory buffer into conventional luminance and chrominance components. The luminance and chrominance components, together with timing data provided by controller 60, are processed by encoder 45 in a conventional manner to form an NTSC signal for display on NTSC compatible image reproduction device 50 e.g. a television or video monitor. Encoder 45 may, in another embodiment, provide RGB output data for display by an RGB compatible reproduction device or a high definition television. Encoder 45 may be a conventional commercially available integrated circuit for signal conversion and NTSC generation.

FIGS. 2–11 depict exemplary User interface menus, according to the invention, generated by unit 37 in conjunction with controller 60 and presented to the User on display unit 50 (FIG. 1). The display menus illustrate the usability, simplicity and navigability advantages offered by the interface.

Figure 2:
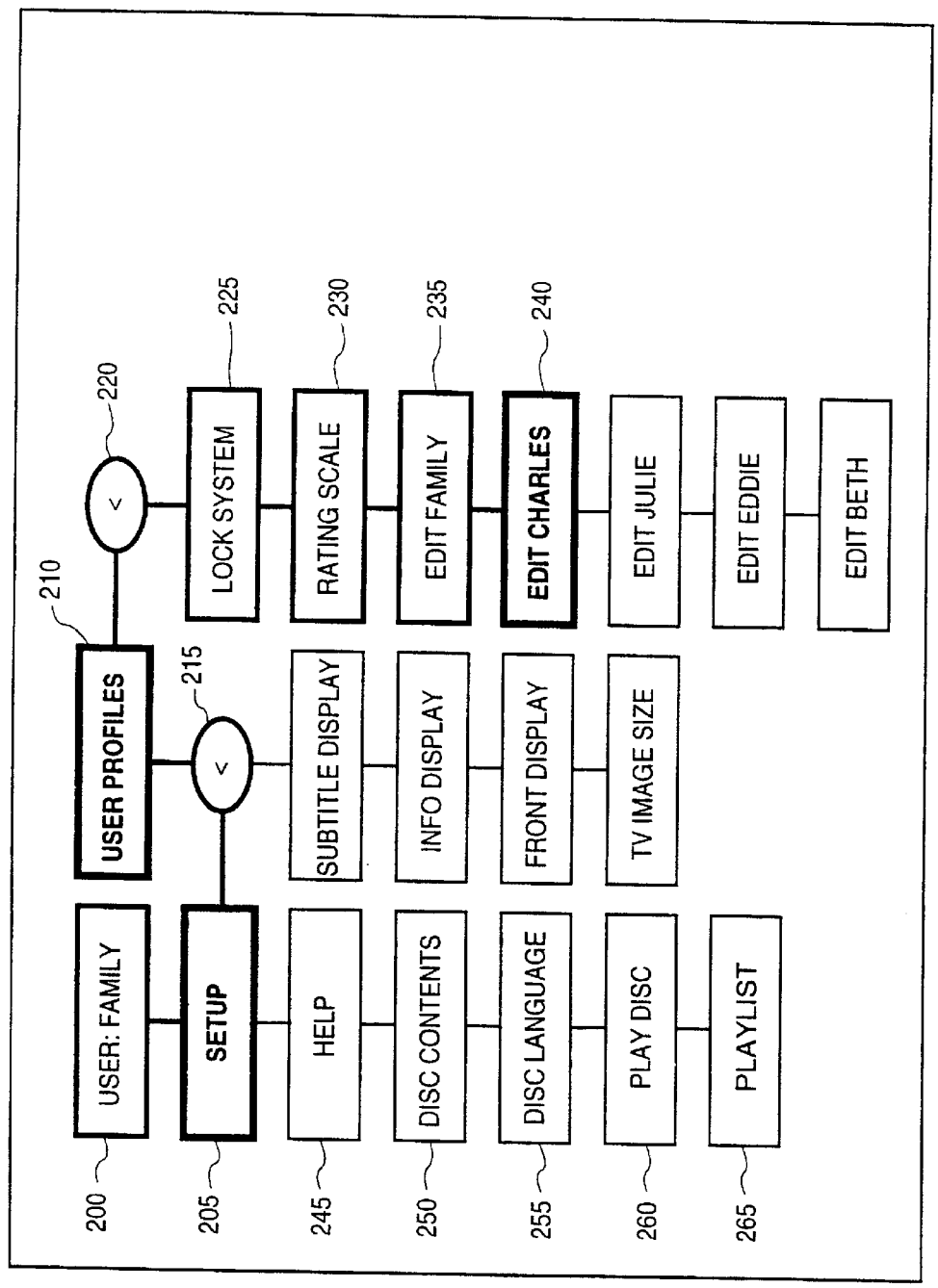
FIG. 2 shows an on-screen User interface display indicating a highlighted navigation path through three hierarchical DVD operational menus, according to the invention.

FIG. 2 shows an on-screen User interface display indicating a base menu and a navigation path through three hierarchical DVD operational menus. Specifically, FIG. 2 identifies the navigation path that a User has followed from a base menu item 205, through entry item 215 and item 210 of a second menu and through menu items 220–235 to item 240 of a third and currently active menu. The base menu in this example comprises option items 200, 205, 245, 250, 255, 260, and 265. The navigation path through items 200–240 is identified to the User by bold highlighting and is traversed following User entry of directional or cursor commands on remote unit 70 (FIG. 1). The menu entry points are indicated by items 215 and 220 (FIG. 2). The menu exit points are identified by a highlighted navigation path from the preceding menu (e.g. from item 210) to the entry point of the next menu (e.g. item 220). The entry and exit points and any intervening items of an individual menu are identified by bold highlighting. This enables a User to readily see the menu navigation path and operation sequence he has followed. In another embodiment, the entry and exit points of a particular menu may be identified (e.g. by highlighting) and intervening items may not be highlighted for identification.

Figure 3:
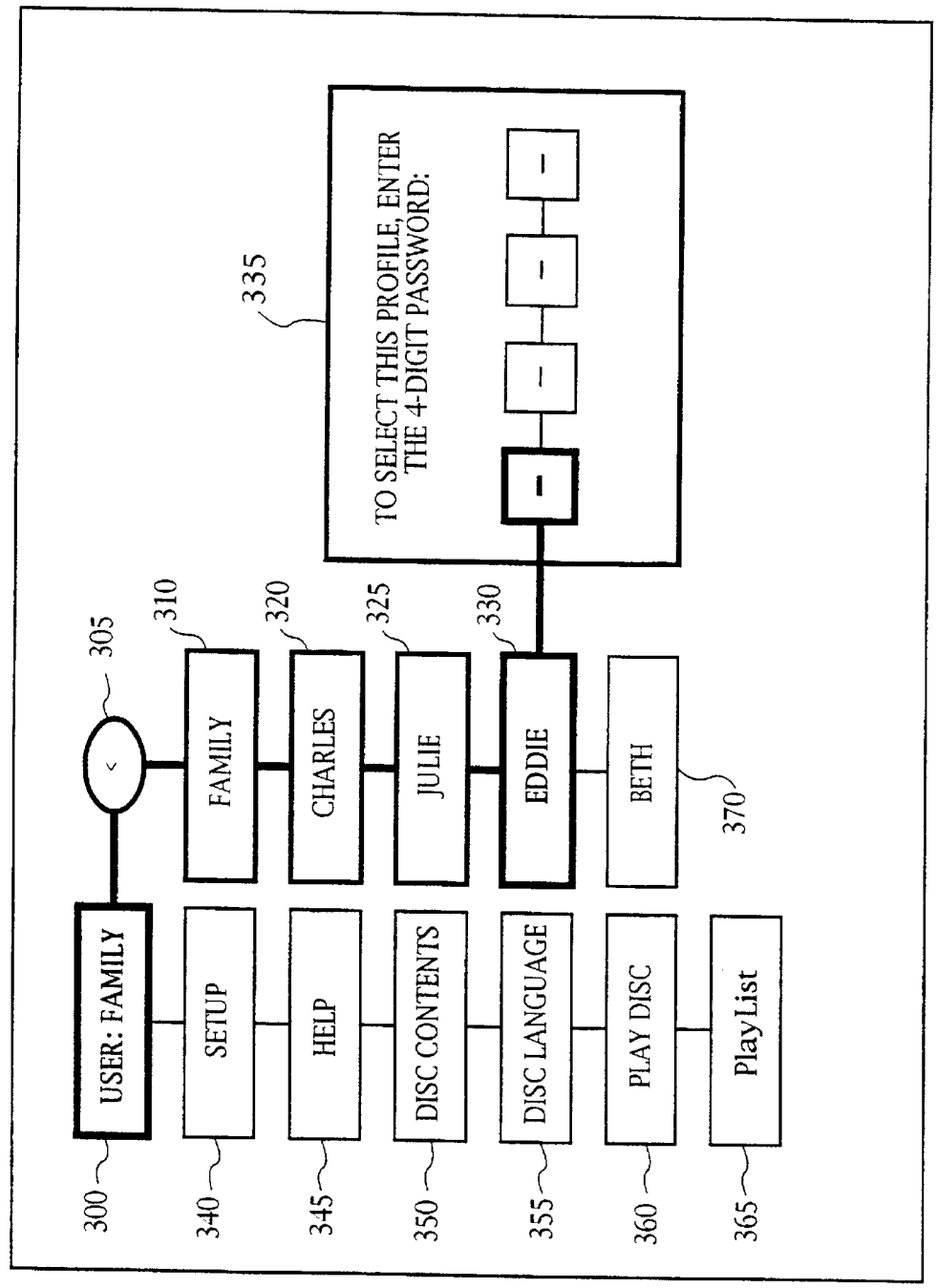
FIG. 3 shows an on-screen User interface display allowing User entry of an operating parameter (a password) within a hierarchical menu structure, according to the invention.

FIG. 3 shows a hierarchical menu display allowing User entry of an operating parameter (a password) within the menu structure. In this example a User has navigated via menu items 300–330 to menu item 335. Menu item 335, a dialog box, enables a User to update an operating parameter of decoder 100, in this case conditional access data in the form of a password for one of the Users.

Figure 4:
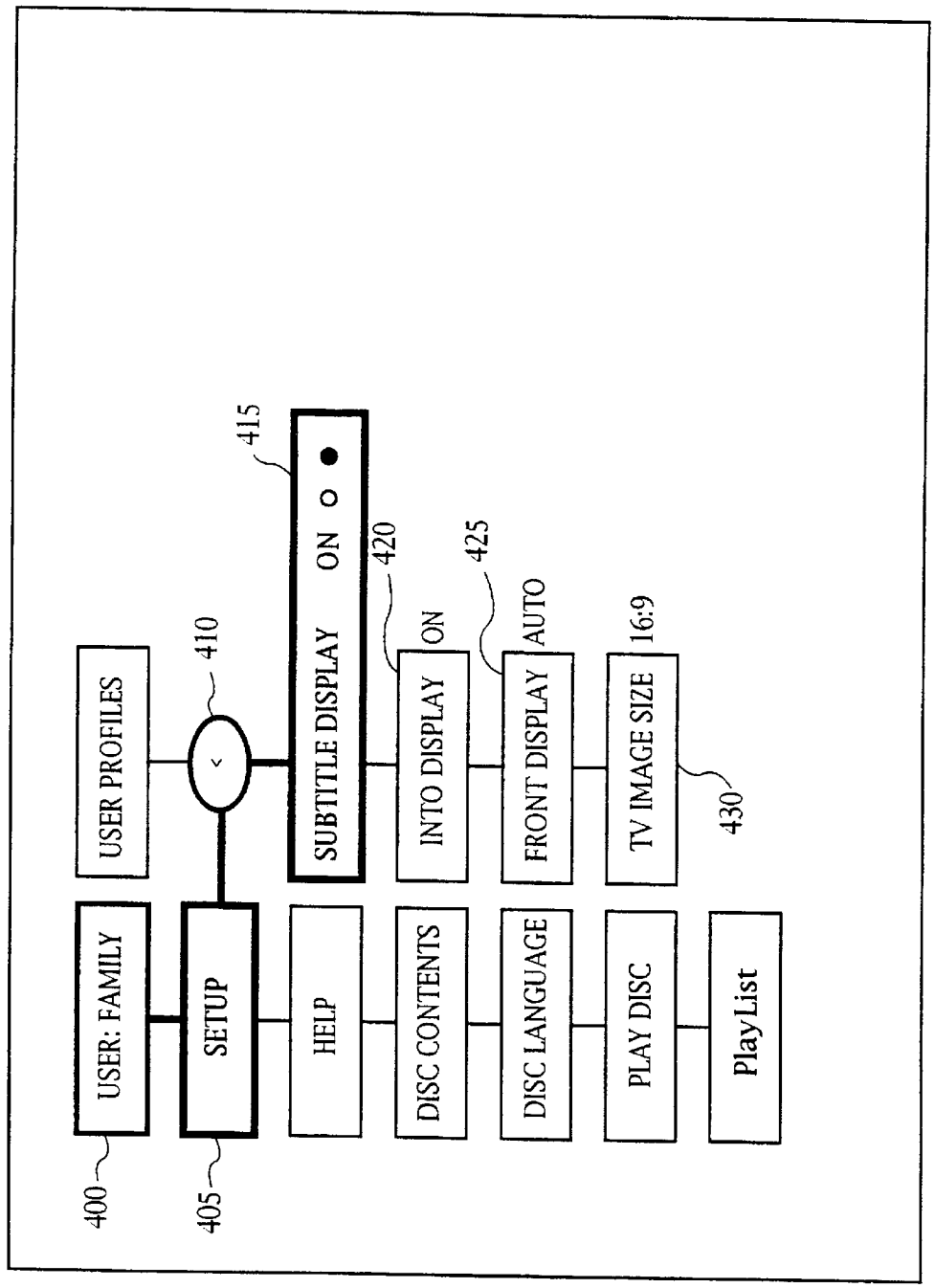
FIG. 4 shows an on-screen User interface display displaying an operating parameter (subtitle activation status) within a hierarchical menu structure, according to the invention.

FIG. 4 shows an on-screen User interface display, according to the invention, displaying an operating parameter (subtitle activation status) within a hierarchical menu structure. In this example, the highlighted menu items and navigation path indicates that a User has navigated via items 400–410 to menu item 415. Menu item 415 indicates subtitle activation status to the User and in this exemplary menu it indicates that the subtitle for the selected movie is to be displayed on unit 50.

Figure 5:
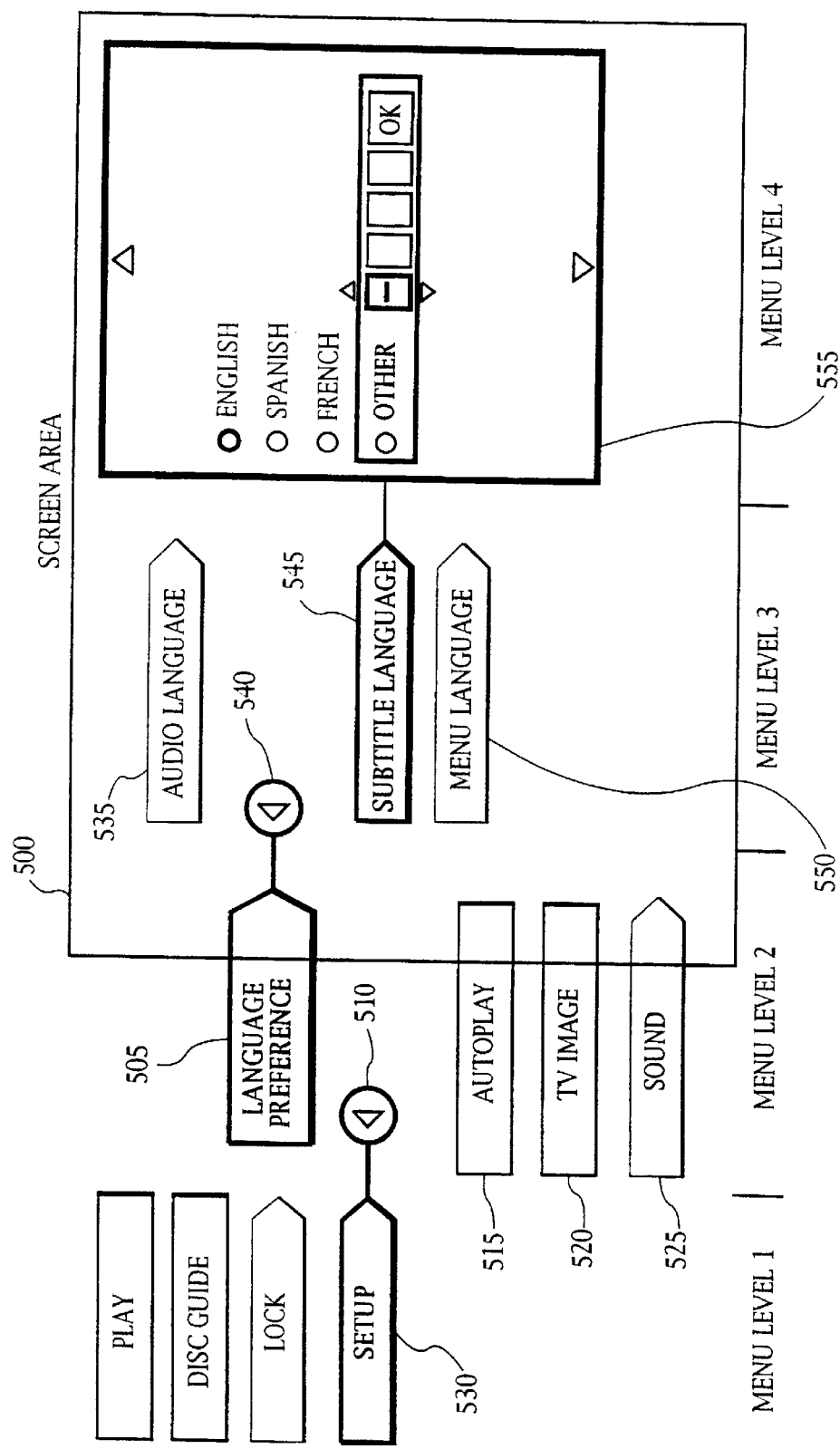
FIG. 5 shows an on-screen User interface display depicting automatic scrolling operation for maintaining User viewability of the currently selectable menu items in a hierarchical menu structure, according to the invention.

FIG. 5 shows an on-screen User interface display, according to the invention, depicting automatic scrolling operation for maintaining User viewability of the currently selectable menu items in a hierarchical menu structure. In this example, a User has progressed through the menu structure from menu level 1 to the currently active menu level 4 via highlighted items 530, 510, 505, 540, 545 and 555. Controller 60 operating in conjunction with unit 37 (FIG. 1) has automatically scrolled the displayed portion of the menu structure horizontally to position the dialog box 555 (menu level 4) at the right of the displayed screen and preceding menu (menu level 3) within screen area 500. As a result, the previously selected menus (levels 1 and 2) have been scrolled from right to left and off-screen leaving displayed screen image 500. The displayed menu structure portion includes dialog box 555 (menu level 4) permitting a User to select a desired subtitle language. A User is able to readily identify and re-trace his highlighted navigation path and may advance through the menu structure knowing that the menus automatically scroll to keep the next menu selection visible and on-screen for the duration of their use.

Figure 6:
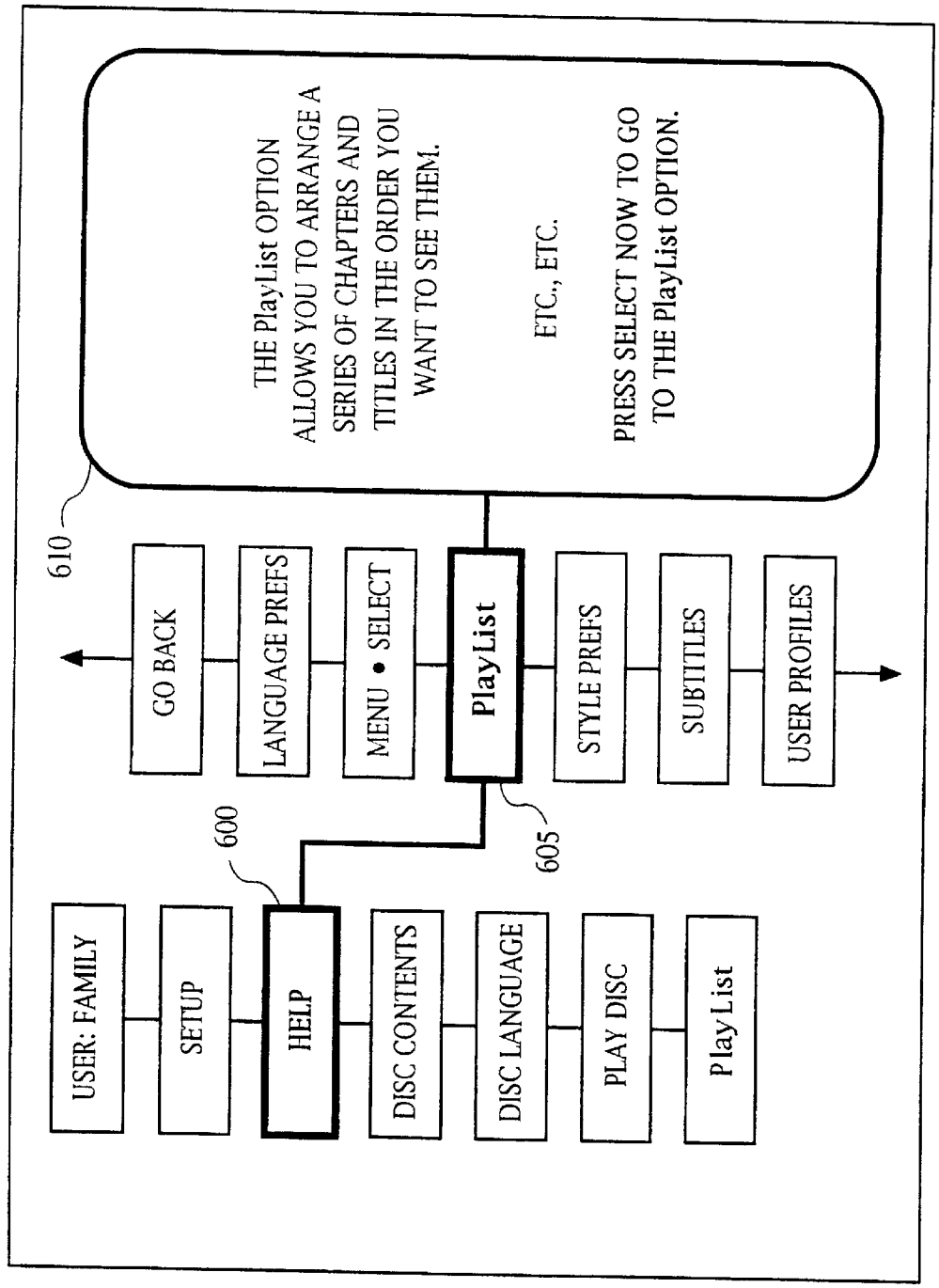
FIG. 6 shows an on-screen User interface display depicting use of a hierarchical menu structure for providing a User with operating instructions or guidance of the type typically presented in a User operating manual, according to the invention.

FIG. 6 shows an on-screen User interface display, according to the invention, depicting use of a hierarchical menu structure for providing a User with operating instructions or guidance of the type that is often presented in a User operating manual. In this example, a User has navigated via items 600–605 to menu item 610. Menu item 610 gives the User instruction concerning the use of menu selection item 605 (Playlist).

Figure 7:
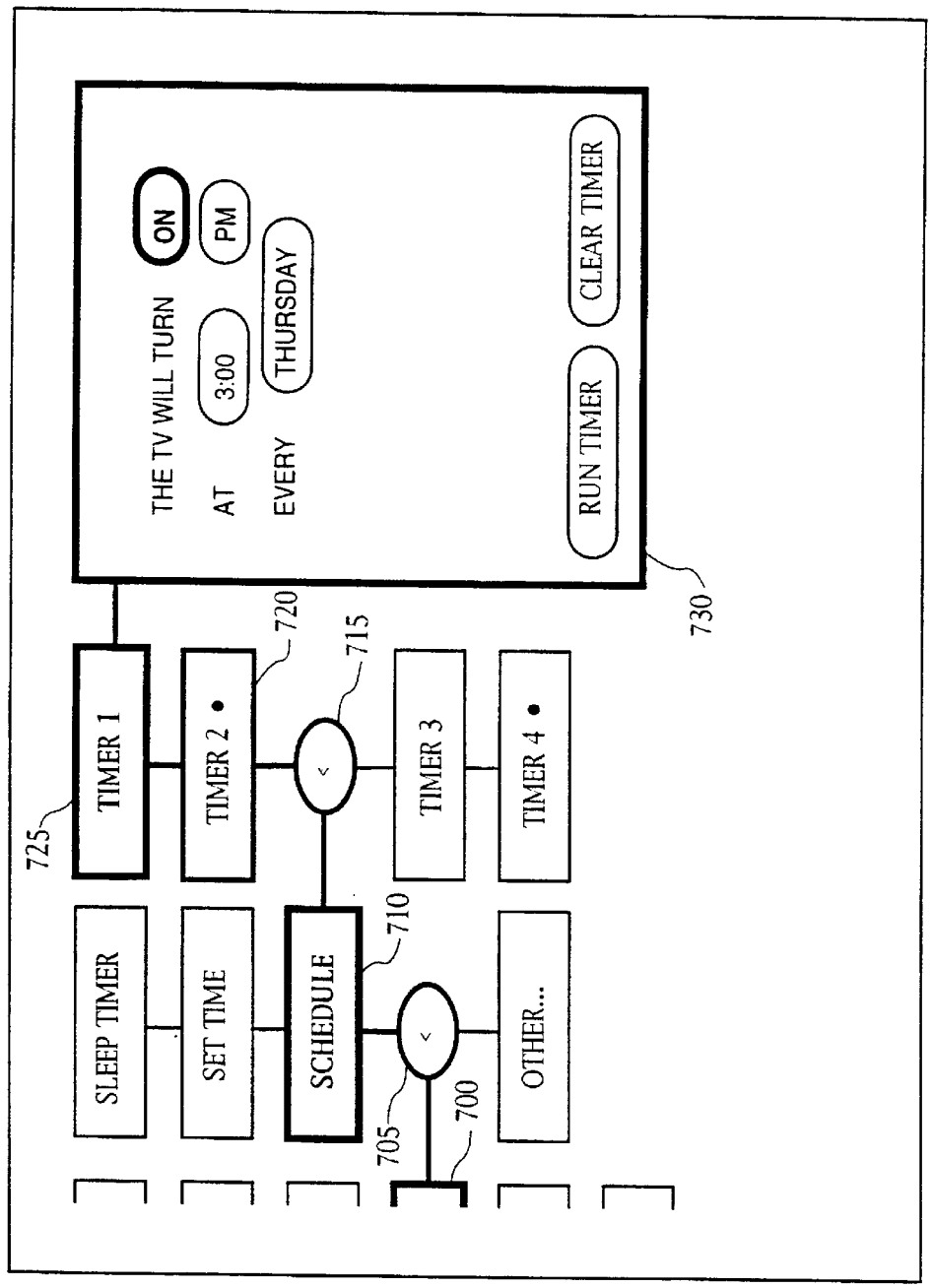
FIG. 7 shows an on-screen User interface display, according to the invention, allowing a User to control operation of a television via operating parameter entry within a hierarchical menu structure.

FIG. 7 shows an on-screen User interface display, according to the invention, allowing a User to control operation of a television via operating parameter entry within a hierarchical menu structure. In this example, a user has navigated via menu items 700–725 to menu dialog box 730. Dialog box 730 allows a User to schedule the time and date of operation of the DVD system by using remote unit 70 (FIG. 1) to enter the desired time and date of operation.

Figure 8:
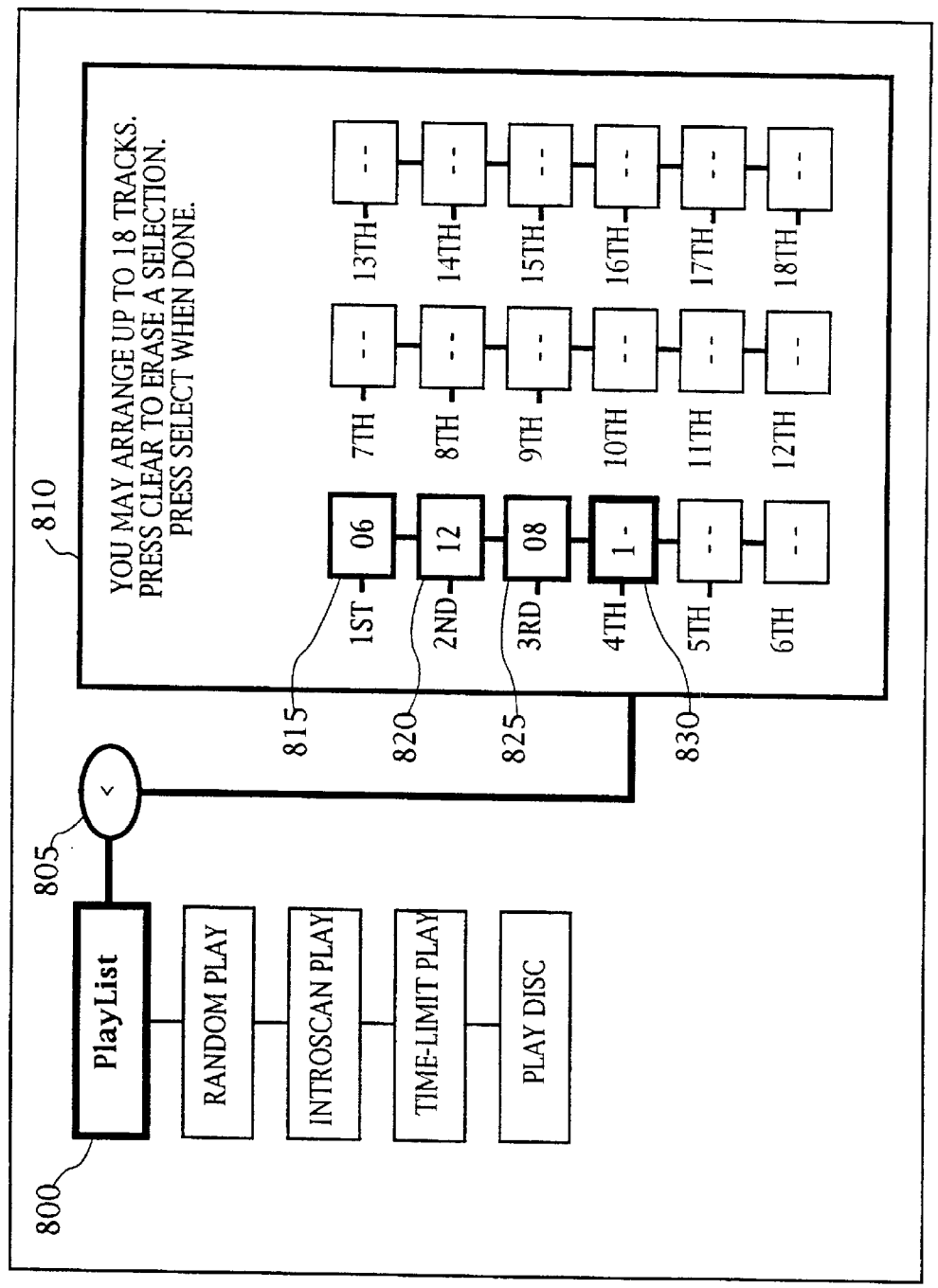
FIG. 8 shows an on-screen User interface display allowing a User to sequence program play via operating parameter entry within a hierarchical menu structure, according to the invention.

FIG. 8 shows an on-screen User interface display, according to the invention, allowing a User to sequence program play via operating parameter entry within a hierarchical menu structure. In this example, DVD decoder 100 operates in CD audio disk play mode. In the menu structure of FIG. 8 a User navigates via menu items 800 and 805 to dialog box 810 for sequencing audio track play. In exemplary item 810 the User sequences play of CD audio tracks 6, 12 and 8 (items 815, 820 and 825 respectively), for example.

Figure 9:
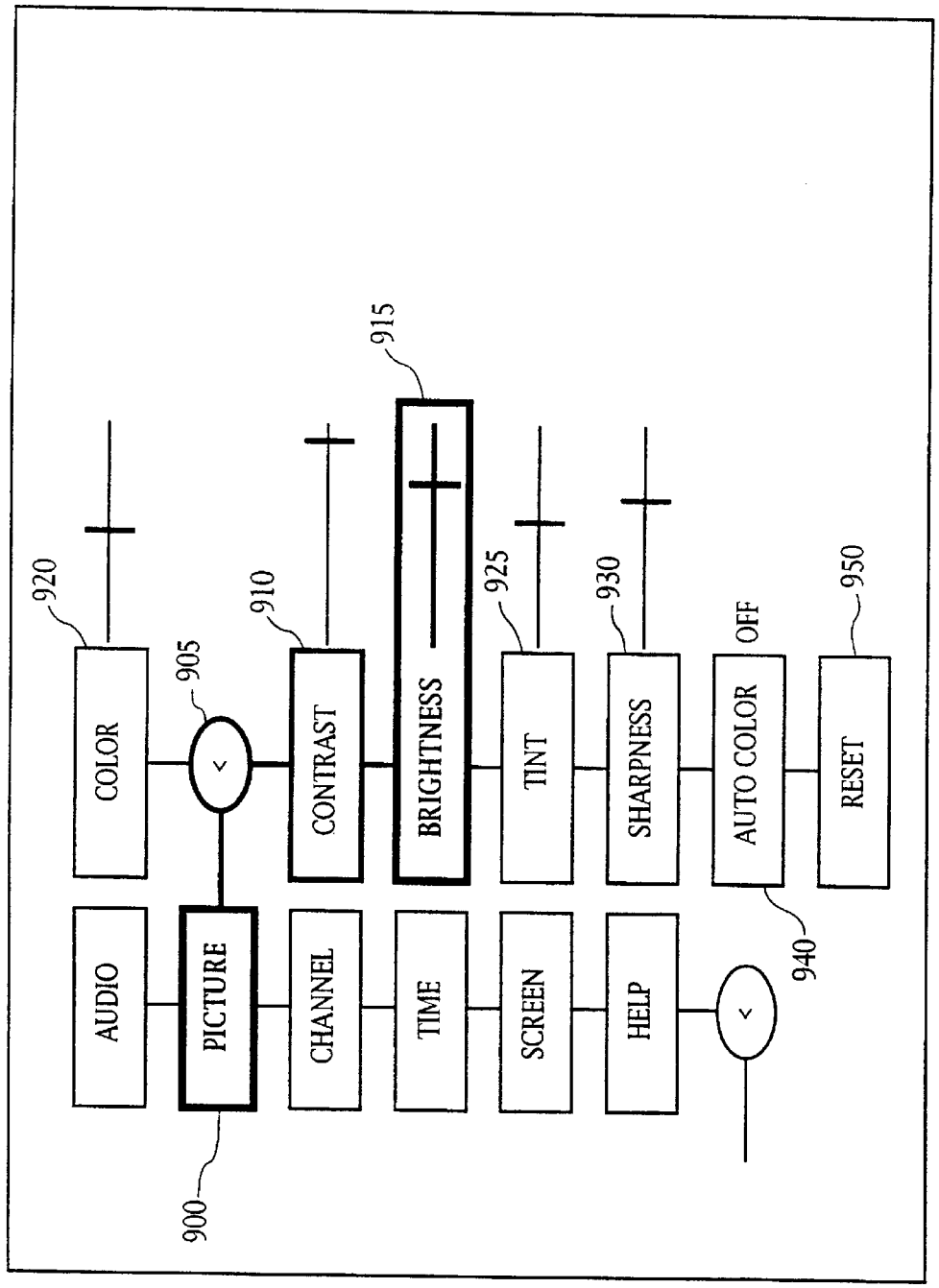
FIG. 9 shows an on-screen User interface display for sequencing User adjustment of television picture characteristics via operating parameter entry within a hierarchical menu structure, according to the invention.

FIG. 9 shows an on-screen User interface display, according to the invention, for sequencing User adjustment of television picture characteristics via operating parameter entry within a hierarchical menu structure. In this example, a User navigates the highlighted menu path through items 900–915. The ordering of menu items within the structure is used to guide the User through a predetermined sequence of display characteristic adjustment functions. For example, a User may be prompted or required to perform the sequenced adjustment of contrast 910, brightness 915, tint 925, sharpness 930 and autocolor selection 950 in the order that they are encountered in navigating through the structure. A User adjusts a parameter directly by icon selection or icon movement using a cursor manipulation entry device such as remote unit 70 (FIG. 1) or a keyboard. Brightness is adjusted by moving the brightness setting bar in item 915, for example.

Figure 10:
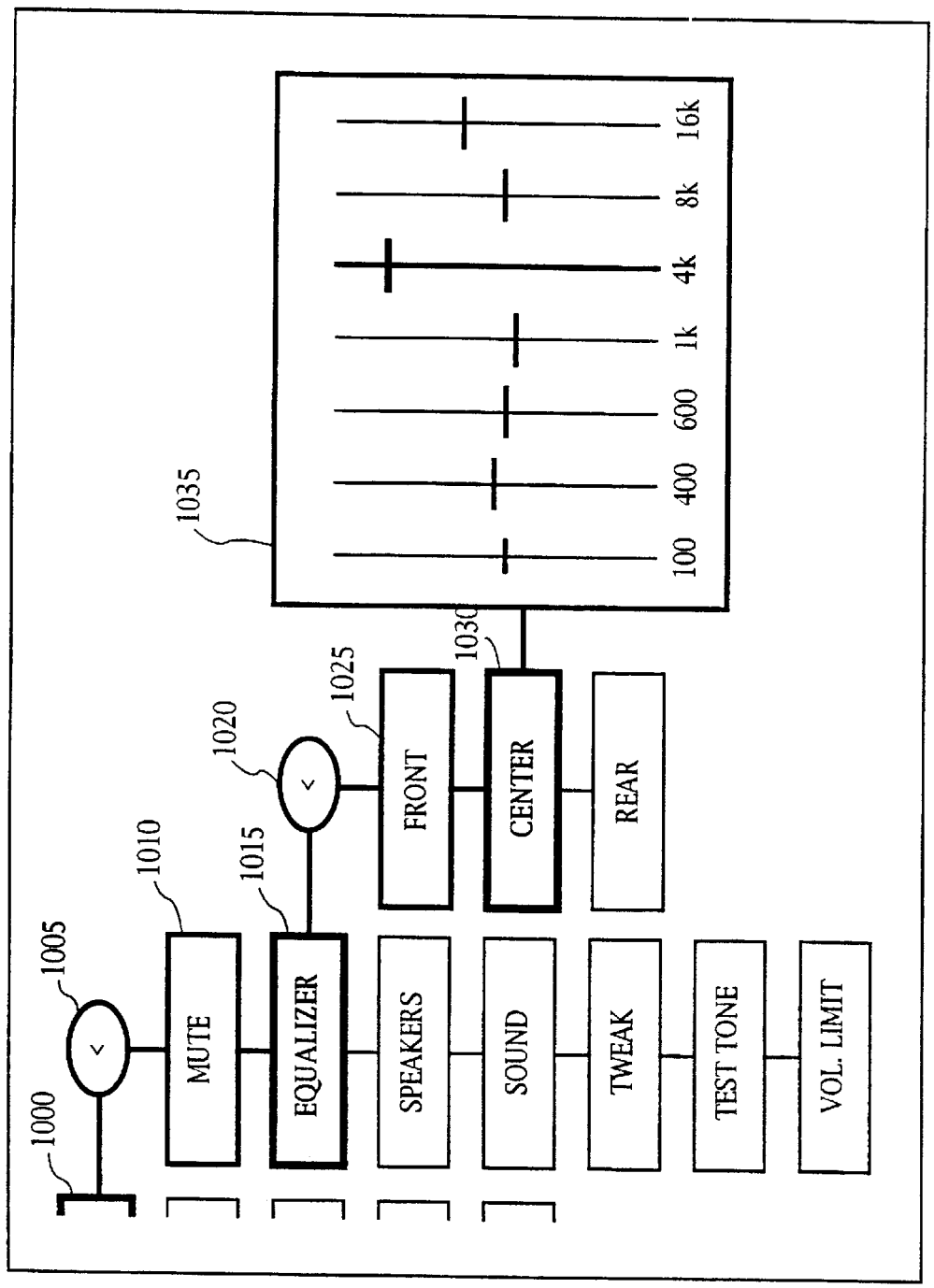
FIG. 10 shows an on-screen User interface display allowing a User to adjust audio characteristics via operating parameter entry within a hierarchical menu structure, according to the invention.

FIG. 10 shows an on-screen User interface display, according to the invention, allowing a User to adjust audio characteristics via operating parameter entry within a hierarchical menu structure. In this example, a User navigates through highlighted menu items 1000–1030 to dialog box 1035 for adjustment of center audio equalizer filter characteristics.

Figure 11:
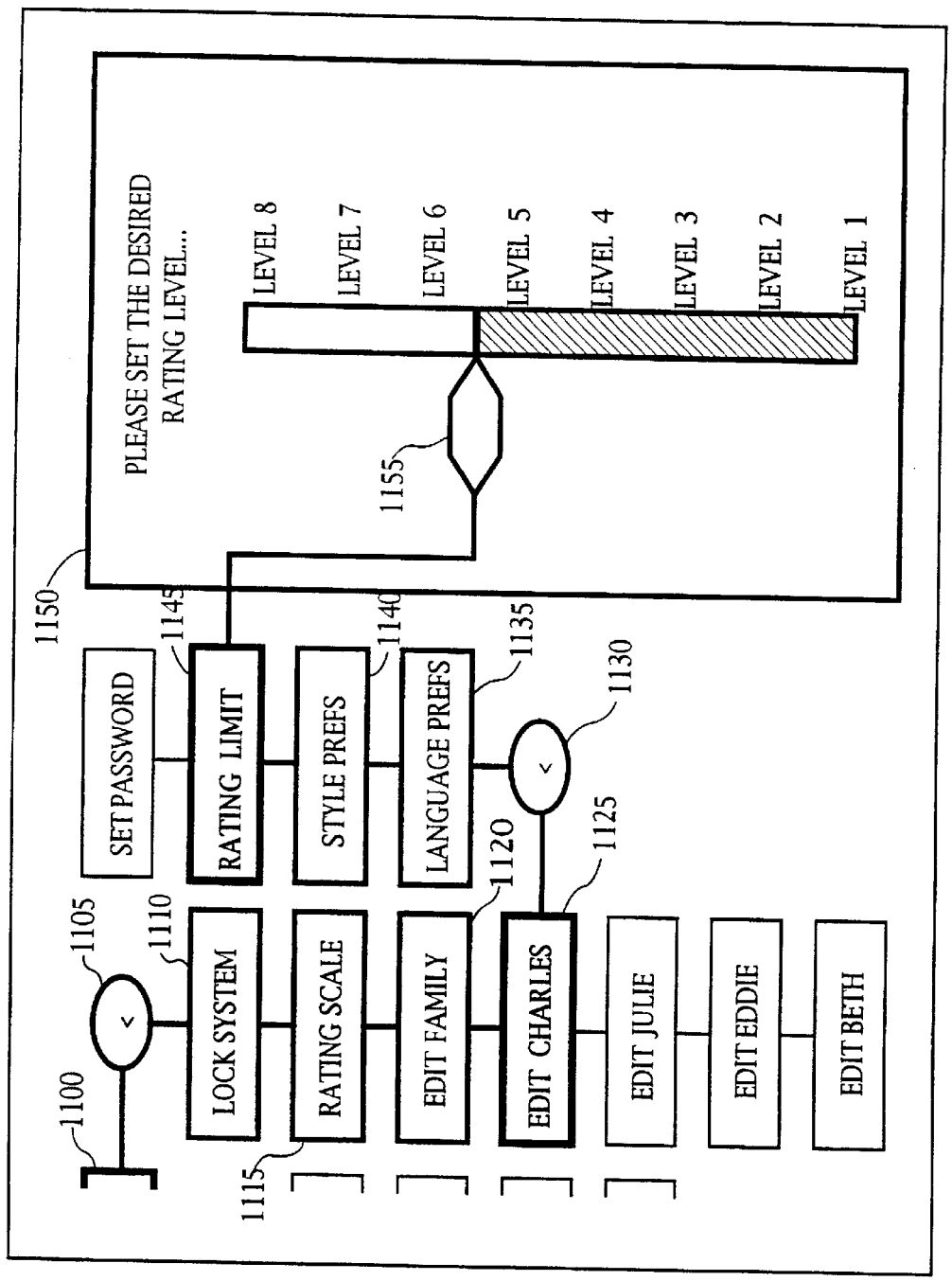
FIG. 11 shows an on-screen User interface display allowing a User to adjust adult content rating limits via operating parameter entry within a hierarchical menu structure, according to the invention.

FIG. 11 shows an on-screen User interface display, according to the invention, allowing a User to adjust adult content rating limits via operating parameter entry within a hierarchical menu structure. In this example, a User navigates through menu items 1100–1145 to dialog box 1150 for adjustment of rating limits of a selected family member (here Charles). The limit is adjusted by movement of icon 1155 in dialog box 1150 using remote unit 70 (FIG. 1).

The principles of the invention may be applied in User interface systems for operating other, non-consumer electronics apparatus as long as the equipment incorporates visual display of information to a User. Such apparatus includes, for example, video processing devices, computers and their peripheral equipment, servers, communication apparatus and Internet servers and devices. Further, the principles of the invention may be applied in User interfaces for use in operating systems and Application programs running on Personal Computers (PCs) or other devices. Such Application programs may include word-processing, database, and file management programs, for example. Also, a wide variety of methods and apparatus may be used in generating a User interface according to the invention principles. The means and method of their generation is not limited to the mechanisms described herein.

What is claimed is:

1. Apparatus including an on-screen display User interface, comprising:

means for generating multiple hierarchically ordered menus for presentation in a merged display including a window for a concurrent Application program initiated via said menus, said menus including a current menu and a preceding parent menu showing a displayed selection path that connects from said parent menu to said current menu and showing a display menu entry and menu exist points, wherein a menu selection item within said menus provides a User at least one of:

A) a display of control information for said apparatus, and

B) control parameter data entry capability; and means for updating said on-screen display in response to User menu item selection.

2. Apparatus according to claim 1 wherein said display generating means provides a continuously visible display of said selection path in a period comprising at least one of:

A) the duration of a User's interactive operation of said apparatus,

B) the duration of a User's interactive operation of said Application program, and C) the duration of a User's operation of said apparatus exclusive of periods of Application program operation.

3. Apparatus according to claim 1 further including database maintaining links between menu items for updating said on-screen display in response to menu item selection by a User.

4. Apparatus according to claim 3 including means for updating said database in response to control parameter data entry by a User.

5. Apparatus according to claim 3 including means for customizing said menus including means for updating said database in response to control parameter data entry by a User.

6. Apparatus according to claim 1 including means for automatically scrolling said menus to maintain said current menu viewable by a User, said scrolling occurring in response to a User menu item selection.

7. Apparatus according to claim 1 wherein
said selection path is identified by at least one of: A) highlighting, B) coloring, C) shading, D) three dimensional shading, E) hatching, F) dashed lines, and G) dashed features.

8. Apparatus according to claim 1 where
said menus comprise a User interface for said Application program.

9. Apparatus according to claim 1 wherein
said control parameter data entry capability includes the capability to enter one or more of A) a password, and B) User profile data.

10. Apparatus according to claim 1 wherein
said menus comprise a set of information and control displays.

11. A processing device, including a User interface for
displaying and selecting device operating parameters, comprising:
    means for generating a display of hierarchically ordered set of control menus for presentation in a merged display including a window for a concurrent Application program initiated via said menus, said menus including a current menu and a preceding parent menu showing a displayed selection path that connects from said parent menu to said current menu and and showing a display menu entry and menu exist points incorporating:
        A) a menu item for displaying a first operating parameter of said device, and
        B) a menu item enabling a User to enter an updated value of a second operating parameter of said device; and
    means for altering said processing device operation in response to said updated value.

12. Apparatus according to claim 11 wherein
said means for altering said processing device operation includes at least one of: A) means for updating a database associating a selectable menu option in a currently displayed menu with a menu that is to be displayed next, B) means for adjusting display visual characteristics, C) means for scheduling program play or record, D) means for setting-up said device, and E) means for updating device conditional access data.

13. Apparatus according to claim 11 wherein
said display generating means provides a continuously visible display of said selection path in a period comprising at least one of:
    A) the duration of a User's operation of said device
    B) the duration of a User's interactive operation of said Application program, and
    C) the duration of a User's operation of said device exclusive of periods of Application program operation.

14. Apparatus according to claim 11 wherein
said hierarchically order menus provide a User interface for an Application program.

15. Apparatus according to claim 11 wherein
said second operating parameter represents one of: A) a password, B) User profile data, C) set-up parameters for said device, D) program play or record data, and E) conditional access data.

16. Apparatus according to claim 15 wherein
said User profile data includes at least one of: A) a language selection, B) a content rating, and C) a program content preference.

17. Apparatus according to claim 11 wherein
said first operating parameter is one of: A) program content information, B) program guide information, C) device operating parameters, and D) device operating manual information.

18. Apparatus according to claim 11 wherein
said current menu items are hierarchically ordered for guiding a User in a sequential selection of sequence sensitive functions.

19. A processing device, including an on-screen User interface display, comprising
    means for generating a display of a plurality of hierarchically ordered menus including a first menu, a second menu preceding said first menu and a third menu preceding said second menu, said display showing a selection path from said third menu to said first menu and said selection path indicating entry and exit points of said second menu, wherein
    said entry and exit points are separated by at least one intervening menu item and said selection path entry point is indicated by an entry icon of variable location within said second menu and said entry icon is located adjacent to a menu item first selected by a user from a plurality of items in said second menu; and
    means for accessing a database supporting the update of said display.

20. Apparatus according to claim 19 wherein
said selection path is identified by at least one of: A) highlighting, B) coloring, C) shading, D) three dimensional shading, E) hatching, F) dashed lines, and G) dashed features.

21. Apparatus according to claim 20 wherein
said selection path is highlighted except for said at least one intervening menu item.

22. Apparatus according to claim 19 wherein
said selection path includes a plurality of intervening menu items representing sequentially ordered functions.

23. Apparatus according to claim 19 wherein
said selection path exit point is indicated by an exit icon.

24. Apparatus according to claim 19 wherein
said display generating means provides a continuously visible display of said selection path in a period comprising at least one of:
    A) the duration of a User's interactive operation of said device,
    B) the duration of a User's interactive operation of an Application program,
    C) the duration of a User's operation of said device exclusive of periods of program play, and
    D) the duration of a User's operation of said device exclusive of periods of Application program operation.

25. Apparatus according to claim 19 including
means for automatically scrolling said display to maintain said first menu viewable by a User, said scrolling occurring in response to a User menu item selection.

26. A method for generating an on-screen User interface display, comprising:
    generating a plurality of hierarchically ordered menus for presentation in a merged display including a window for a concurrent Application program initiated via said menus, said menus including a current menu and a preceding parent menu showing displaying a selection path that connects from said parent menu to said current menu and showing a display menu entry and menu exist points wherein a menu selection item within said parent menu provides a User at least one of:
A) a display of control information for a device, and
B) control parameter data entry capability; and updating said on-screen display in response to User menu item selection.

27. A method for producing a User interface for displaying and selecting device operating parameters, comprising:

generating a display of hierarchically ordered set of control menus for presentation in a merged display including a window for a concurrent Application program initiated via said menus, said menus including a current menu and a preceding parent menu showing a selection path that connects from said parent menu to said current menu and and showing a display menu entry and menu exist points incorporating,
A) d a menu item for displaying a first operating parameter of said device, and
B) a menu item enabling a User to enter an updated value of a second operating parameter of said device; and altering said processing device operation in response to said updated value.

28. A method for generating an on-screen User interface display comprising:

generating a display of a plurality of hierarchically ordered menus including a first menu, a second menu preceding said first menu and a third menu preceding said second menu, said display showing a displayed selection path from said third menu to said first menu and said selection path indicating entry and exit points of said second menu, wherein said entry and exit points are separated by at least one intervening menu item and said selection path entry point is indicated by an entry icon of variable location within said second menu and said entry icon is located adjacent to a menu item first selected by a user from a plurality of items in said second menu; and accessing a database supporting the update of said display.

29. Apparatus including an on-screen display User interface, comprising:

means for generating a display of multiple hierarchically ordered menus including a current menu and a preceding parent menu, showing a displayed selection path that connects from said parent menu to said current menu and showing a display menu entry and menu exist points wherein said display generating means provides a continuously visible display of said selection path in a period comprising at least one of:
A) the duration of a User's interactive operation of said apparatus
B) the duration of a User's interactive operation of an Application program, and
C) the duration of a User's operation of said apparatus exclusive of periods of Application program operation; and means for updating said on-screen display User interface in response to User menu item selection.

* * * * *